April 30, 1940. N. T. ESHBAUGH 2,198,807
INSECT TRAPPING ELECTRIC FIXTURE
Filed March 10, 1937
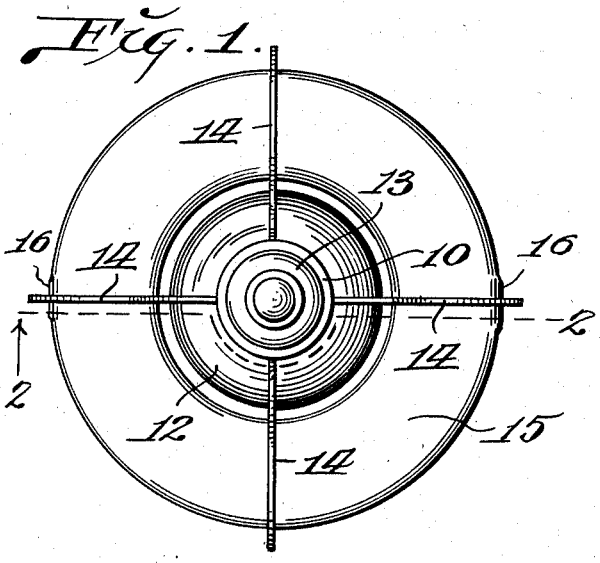
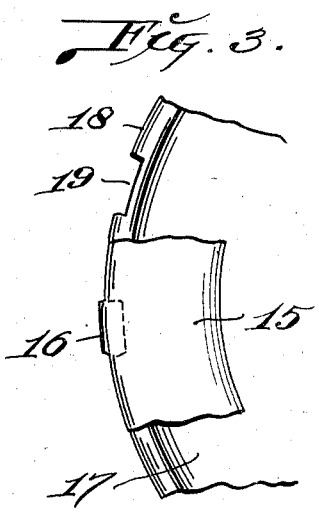
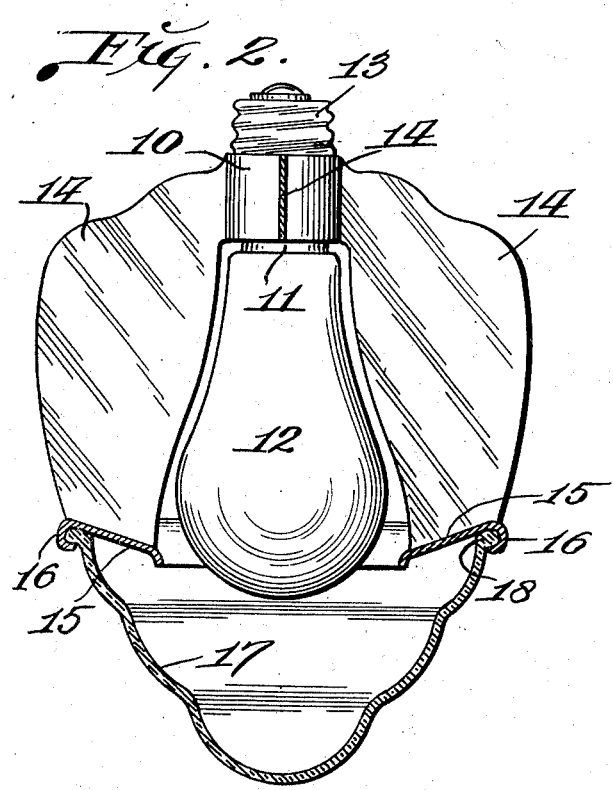
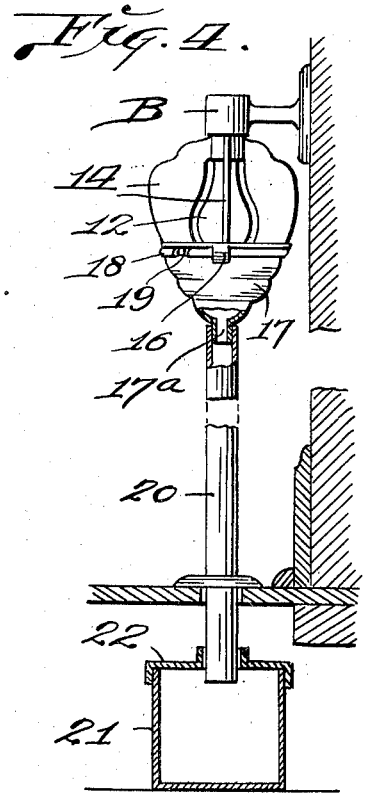
INVENTOR,
NEWTON T. ESHBAUGH,
BY Martin O. Smith ATTY.

Patented Apr. 30, 1940

2,198,807

UNITED STATES PATENT OFFICE 2,198,807

INSECT TRAPPING ELECTRIC FIXTURE

Newton T. Eshbaugh, Phoenix, Ariz.

Application March 10, 1937, Serial No. 130,067

1 Claim. (Cl. 43—113)

My invention relates to an insect trapping electric fixture, and the construction disclosed herein is an improvement on the invention disclosed in application for United States Letters Patent filed by me March 30, 1931, Serial Number 536,365.

The principal objects of my present invention are to generally improve upon and simplify the construction of the insect trapping electric fixture disclosed in my aforesaid application for patent, as well as other devices utilized for trapping nocturnal insects that are attracted by a bright light, and, further, to provide a combined trap and fixture that is simple in construction, of neat and pleasing appearance, and which comprises few parts that are capable of being readily assembled or taken apart.

A further object of my invention is to provide a combined insect trap and lighting fixture of the character referred to wherein that portion of the trap that surrounds the electric lamp is constructed and disposed so as to not interfere in any way with or cut down the light rays emanating from the lamp, and the transparent or translucent bowl that forms the lower portion of the combined trap and fixture functioning as a receptacle for the trapped insects, and also for the outward and downward diffusion of light from the electric lamp that is associated with the fixture.

With the foregoing and other objects in view my invention consists in certain novel features of construction and arrangements of parts that will be hereinafter more fully described and claimed and illustrated in the accompanying drawing, in which:

Fig. 1 is a top plan view of a combined insect trap and electric lighting fixture constructed in accordance with my invention.

Fig. 2 is a vertical cross section taken on the line 2—2 of Fig. 1.

Fig. 3 is a detail plan view showing a portion of the bowl that forms the lower part of the fixture and a portion of a trapping and deflecting ring from which the bowl is suspended.

Fig. 4 is an elevational view with parts broken away of the combined trap and fixture applied to a wall bracket and with a conduit leading from the lower portion of the bowl for carrying off the insects that are trapped in the device.

Referring by numerals to the accompanying drawing which illustrates a preferred embodiment of my invention, 10 designates an internally threaded socket adapted to receive the threaded plug 11 of a conventional electric lamp bulb 12, and extending upwardly from socket 10 is a threaded plug 13 of conventional form that is adapted to be screw seated in an electric socket.

Permanently secured to the socket 10 are the upper ends of a plurality of vertically disposed radially arranged plates or vanes 14, preferably of thin sheet metal and which may be colored white or finished and polished to produce reflecting surfaces. In the drawing I have shown four of these plates or vanes, but it will be understood that the number of plates utilized may be varied as desired.

These plates extend outwardly and thence downwardly with their inner edges spaced apart a sufficient distance to accommodate the lamp bulb 12, and secured to the lower ends of said plates 14 is a ring 15, preferably formed of sheet metal. This ring gradually declines from its outer to its inner edge and formed on the outer edge of said ring, preferably at diametrically opposite point, are downwardly and inwardly presented lips 16 that function as hooks for engaging a flange on the upper edge of the bowl that forms the lower part of the fixture.

This bowl, designated by the numeral 17, is formed of glass, either transparent or translucent, and formed integral with the upper edge of said bowl is a rib or flange 18 which, when applied to the ring 15, occupies a position immediately beneath the outer edge of said ring.

Formed in the marginal flange 18, at diametrically opposite points, are notches 19 for the accommodation of the pair of lips or hooks 16, and after the bowl is positioned against the underside of ring 15, with the hooks or lips positioned in the notches 19, the bowl is rotated a short distance in either direction so as to move the lips or hooks out of registration with the notches 19, and thus said lips or hooks engage the underside of the rib or flange 18 to securely connect the bowl 17 to ring 15, (see Fig. 3). That portion of the bowl 17 below the circumferential flange 18 may be of any desired size and contour.

In the use of my improved insect trap and lighting fixture, the threaded plug 13 is inserted in a conventional lamp socket so that the fixture is suspended in a substantially vertical position, and when the lamp is lighted at night, flying insects are attracted by the light, and as they fly against the lamp bulb the insects will be momentarily stunned and will drop downward between the lower portion of the lamp bulb and the inner lower edge of the ring 15.

If the flying insects attempt to fly around the lamp, they will sooner or later strike against the plates 14 and then drop downwardly between the lamp bulb and the inner edge of ring 15.

The greater number of insects that are trapped in the bowl 17 will die in a short time as the result of the heat from the lamp bulb and if any of the insects should attempt to crawl upwardly within the bowl they will be prevented from escaping the combined trapping and deflecting ring 15 which extends inwardly and downwardly from the upper edge of the bowl.

In the modified construction illustrated in Fig. 4, the bowl 17 that is suspended from the ring 15 is provided with a short centrally arranged depending tube 17a, and detachably connected thereto is the upper end of a tube 20 that leads downwardly to a suitably located receptacle 21 having a removable cover 22. This construction is particularly adapted for use where the fixture is attached to a wall bracket such as B.

Thus it will be seen that I have provided a combined insect trap and electric lighting fixture that is relatively simple, in construction, inexpensive in manufacture and very effective in performing its intended functions.

The plates or vanes that surround the electric lamp bulb are disposed so that they do not in any way interfere with the light rays that radiate from the lamp bulb, and where said plates are provided with white or polished surfaces they function as reflectors for the light rays from the bulb and thus serve to enhance the insect-attracting qualities of the device.

The inclined ring plate 15, in addition to functioning as a deflector to cause any insects that drop thereon, to drop into the bowl also functions to trap the insects within the bowl and prevent their escape therefrom in the event that they attempt to escape by crawling up the inner surface of the bowl.

It will be understood that minor changes in the size, form and construction of the various parts of my improved insect trapping electric fixture may be made and substituted for those herein shown and described without departing from the spirit of the invention, the scope of which is set forth in the appended claim.

I claim as my invention:

A combined insect trap and electric lighting fixture comprising a socket adapted to receive the threaded plug of an electric lamp, a threaded plug projecting from the upper end of said socket and adapted to be seated in a conventional electric lamp socket, a plurality of radially disposed plates having their ends fixed to said socket, said plates projecting outwardly and downwardly from said socket, the lower ends of which plates terminate above the plane occupied by the lower end of the electric lamp that is seated in said socket, a combined insect deflecting and trapping ring secured to the lower ends of said plates and extending from their lower outer corners inwardly and downwardly to the lower inner corners of said plates, which ring is wholly above the plane occupied by the lower end of the electric lamp that is seated in said socket, with the inner edge of said ring spaced apart from the lower portion of said electric lamp, integral hooks formed on the outer edge of said ring and projecting downwardly and inwardly therefrom, a bowl of transparent material positioned beneath said ring, there being notches formed in the upper edge of said bowl for the accommodation of the hooks on said ring and the major portion of which bowl is located wholly below the lower end of the electric lamp that is positioned in said socket.

NEWTON T. ESHBAUGH.